US012291436B2

(12) United States Patent
Span et al.

(10) Patent No.: US 12,291,436 B2
(45) Date of Patent: May 6, 2025

(54) BEARING ASSEMBLY IN A MOBILE HYDRAULIC CRANE TELESCOPIC ARM AND A MOBILE HYDRAULIC CRANE COMPRISING SUCH ASSEMBLY

(71) Applicants: Iztok Span, Ljubljana (SI); Branko Gril, Prestranek (SI); Boris Jerman, Radomlje (SI); Luka Bizjak, Col (SI)

(72) Inventors: Iztok Span, Ljubljana (SI); Branko Gril, Prestranek (SI); Boris Jerman, Radomlje (SI); Luka Bizjak, Col (SI)

(73) Assignee: TAJFUN LIV, PROIZVODNJA IN RAZVOJ D.O.O. (SI)

( * ) Notice: Subject to any disclaimer, the term of this patent is extended or adjusted under 35 U.S.C. 154(b) by 204 days.

(21) Appl. No.: 18/000,648

(22) PCT Filed: Jun. 10, 2021

(86) PCT No.: PCT/SI2021/000007
§ 371 (c)(1),
(2) Date: Dec. 2, 2022

(87) PCT Pub. No.: WO2021/257003
PCT Pub. Date: Dec. 23, 2021

(65) Prior Publication Data

US 2023/0227292 A1 Jul. 20, 2023

(30) Foreign Application Priority Data

Jun. 19, 2020 (SI) .................................. 202000111

(51) Int. Cl.
*B66C 23/64* (2006.01)
*B66C 23/70* (2006.01)

(52) U.S. Cl.
CPC ............ *B66C 23/64* (2013.01); *B66C 23/701* (2013.01)

(58) Field of Classification Search
CPC .............................. B66C 23/64; B66C 23/707
See application file for complete search history.

(56) References Cited

U.S. PATENT DOCUMENTS 7,878,349 B2 * 2/2011 Wimmer ............... B66C 23/701 212/348
2005/0045575 A1 * 3/2005 Wimmer ............... B66C 23/707 212/350

(Continued)

FOREIGN PATENT DOCUMENTS

DE 2317595 A1 10/1974
DE 20120121 U1 3/2002

(Continued)

OTHER PUBLICATIONS

International Search Report and Written Opinion dated Oct. 6, 2021 issued in PCT/SI2021/000007 (11 pages).

*Primary Examiner* — Sang K Kim
*Assistant Examiner* — Nathaniel L Adams
(74) *Attorney, Agent, or Firm* — Haynes and Boone, LLP; William B. Nash; Brooke Parker

(57) ABSTRACT

The present disclosure includes a telescopic bearing assembly capable of withstanding predetermined bending loads and at the same time is fully telescopically extendable, while minimizing a wall thickness (t) in each of tubular bearing sections of an associated telescopic arm. Additionally, the present disclosure includes a mobile hydraulic telescopic crane with a telescopic arm with such an assembly.

14 Claims, 3 Drawing Sheets

(56) References Cited

U.S. PATENT DOCUMENTS

| | | | | |
|---|---|---|---|---|
| 2014/0263145 | A1* | 9/2014 | Wimmer | B66C 23/707 212/299 |
| 2018/0229977 | A1* | 8/2018 | Hangoebl | B66C 23/54 |
| 2023/0219792 | A1* | 7/2023 | Gril | B66C 23/54 212/300 |

FOREIGN PATENT DOCUMENTS

| | | | |
|---|---|---|---|
| EP | 0583552 | B1 | 2/1994 |
| EP | 2185461 | B1 | 5/2010 |
| EP | 2185462 | A1 | 5/2010 |
| EP | 2185462 | B1 | 5/2010 |
| EP | 2683645 | A1 | 1/2014 |
| EP | 2789566 | A1 | 10/2014 |
| WO | WO 98/17576 | A1 | 4/1998 |

* cited by examiner

BEARING ASSEMBLY IN A MOBILE HYDRAULIC CRANE TELESCOPIC ARM AND A MOBILE HYDRAULIC CRANE COMPRISING SUCH ASSEMBLY

CROSS-REFERENCE TO RELATED APPLICATIONS

This application is a United States national phase application of co-pending International Patent Application No. PCT/SI2021/000007, filed on 10 Jun. 2021, which claims the benefit of Slovenia Patent Application No. P-202000111 filed 19 Jun. 2020, both of which are hereby incorporated by reference in their entirety.

BACKGROUND

The present disclosure refers to a bearing assembly in a mobile hydraulic crane telescopic arm and a mobile hydraulic crane comprising such an assembly. According to the International Patent Classification such inventions belong to the field of mobile jib cranes comprising a telescopic arm, namely to the class B 66 C 23/687.

The present disclosure is based on a problem of how to design a bearing assembly in a mobile crane telescopic arm, which comprises at least two tubular bearing sections, which are configured to be inserted within each other and telescopically moveable in the axial direction thereof, minimizing the weight of each of the bearing sections with regard to its maximum allowable carrying capacity while taking into consideration the bending stresses and other stresses during the moving of each load during the regular use of the crane, further, the shape of each profile, namely the transversal cross-section of each tubular bearing section is configured such that contact between the mutually overlapping sections minimizes wear as well allowing for stresses and deformations even during maximum extension and loading of the telescopic arm, for example in the situation where bending stresses are transferred from one bearing section to another bearing section within relatively narrow local areas, in which said bearing sections remain mutually overlapped.

Mobile hydraulic cranes with telescopic arms are widely known from the state of the art, and some of them are also disclosed in patent literature, e.g. in EP 2 789 566 A1, EP 2 683 645 A1, WO 98/17576 A1 and other sources. A telescopic mobile hydraulic crane typically comprises a bearing platform, which can be attached to a vehicle and is generally fitted with at least two telescoping support legs for supporting the crane during use, providing stability against leaning and over turning of the crane and/or vehicle, especially while bearing loads. On said platform, a column is attached in such a manner that it can be rotated around the vertical axis by a suitable driving means, on the free end of which a primary arm of the crane is attached with its first end portion in such a manner that it can be pivoted around the horizontal axis and is simultaneously supported by a hydraulic cylinder, which is pivotally attached to said column. On the opposite free terminal portion of the primary arm a secondary arm is attached, which can also be pivoted around the horizontal geometric axis and is telescoping. Said secondary arm is pivotable relative to the primary arm around said vertical axis by means of a hydraulic cylinder, which is on one side pivotally connected to the primary arm and is on the other side either directly or indirectly connected to the secondary arm by a suitable linking mechanism. Said telescoping second arm consists of at least two tubular bearing sections, which are inserted within each other, wherein the inner bearing section is allowed either to be pushed axially towards the interior of the external bearing section, or to be retracted at certain extent from the external bearing section, which can usually be performed by means of a roller chain, wherein a sufficient overlapping area between said bearing sections is provided in order to ensure the required necessary bending strength of such an assembly and consequently the required carrying capacity of the crane. On the free terminal portion of the inner bearing section a mounting point is provided, to which a grabber is attached either directly or indirectly with a suitable hydraulic rotational unit, which is suitable for manipulating a load and which is usually powered by a hydraulic driving means. In general, such a telescopic arm comprises at least two tubular bearing sections, which are inserted within each other, wherein each available bearing section is subsequently installed inside the telescopic arm by suitable driving means, e.g. by means of a roller chain as installed inside the telescopic arm. Each bearing section may be telescopically moveable from its initial retracted position, in which all the bearing sections are positioned within each other and are all located together inside of the external bearing section, into its extended position, in which all bearing sections are outwardly extended as much as possible in their axial direction, such that each inner section is to a certain extent extended from each associated external bearing section therewith, however, each pair of associated sections is still mutually overlapped at least to such extent that the whole telescopic arm still remains capable of withstanding certain bending stresses, which result from the weight of the telescopic arm and also from each load, which can be attached to the free terminal portion of such a telescopic arm.

Realisation and use of such a telescopic arm in the cranes described above are connected to several important aspects. In the case of mobile cranes, it should be taken into account that the dimensions of the crane in its collapsed state, in which it is suitable for transporting, are upwardly limited on the basis of strict regulations, since otherwise the crane could excessively extend over the width of the vehicle and prevent access on normal roads without employing special additional measures. This of course means, that the whole length of the telescopic arm in its initial position, when the bearing sections are completely retracted and are placed within each other, is upwardly limited. On the other hand, the primary goal of installing such a telescopic arm on a crane is without doubt to extend the reach of the crane as much as possible, with the telescopic assembly extended as much as possible. However, the telescopic arm is only extendable to an extent, which in the case of a completely extended telescopic arm, remaining areas of mutual overlapping bearing sections are still sufficient to withstand bending and other stresses, which result from the weight of the load when carried by the crane, from weight of the bearing sections of the telescopic arm and also from other influences, which unavoidably appear during the use of a crane with or without carrying a load, e.g. inertia forces and similar impacts. It is understood by a person skilled in the art that either a partially or fully extended and fully loaded telescopic arm must function with regard to stresses and deformations, e.g. when lifting and transferring each load with by means of a partially or fully extended telescopic arm, in particular the areas of mutual overlapping between each adjacent bearing sections are exposed to extreme stresses, as well as with regard to mobility of individual bearing sections relative to each other, which means that even in such case either controlled retraction or controlled extension of the telescopic arm to its maximum length must be enabled, since otherwise the crane practically could not be controlled by carrying of the load. Critically high loads and elastic deformations in said overlapping areas between adjacent bearing sections of the telescopic arm is therefore a practical reason that in most currently used mobile telescopic cranes such a telescopic arm is a bulky assembly consisting of heavy and thick-walled square or rectangular tubes, and manufactures of cranes usually provide for relatively large areas of mutually overlapping bearing sections for fully extended telescopic arms, which results in a relatively small amount of expansion. Thus, the reach of the telescopic arm, and therefore the action radius of the entire crane is significantly smaller than it could be due to said thick-walled tubular design of said bearing sections. Further, the weight of the telescopic arm as such is relatively high, which during the use of the crane results in the reduction of effective carrying capacity of the crane when the telescopic arm is extended. The previously mentioned shortcomings refer only to the subject of stresses during use of the crane. In addition to the higher expenses resulting from construction by using a heavier telescopic arm and more energy consumption by manufacturing such a crane, whenever such a crane is mounted onto a motor vehicle, the total mass and carrying capacity is limited on normal roads, which means that increased weight of the crane results in decreased carrying capacity, namely the effective carrying capacity of the vehicle, which remains available for transporting of other loads. This increased weight of the crane in combination with position of the centre of mass, which is located relatively high above the ground influences the driving performances of the entire vehicle, including the fuel consumption. The presence of the additional mass on the vehicle during driving furthermore leads to additional inertial forces, which are transferred from the telescopic arm towards the column and the bearing platform and subsequently towards to the bearing construction of the entire vehicle, which means that the superfluous mass of the telescopic arm on the crane results in additional stresses within numerous other bearing elements of the entire mobile crane and associated vehicle.

In order to increase the bending strength of the telescopic arm by means of a simple design, a telescopic arm of a mobile crane is proposed in EP 0 583 552 B1, which also comprises tubular bearing sections, however each of said tubular bearing sections, which are inserted within each other and are telescopically moveable along each other, are designed with a characteristic transversal cross-section, which is mirror-symmetric with regard to the vertical geometric axis and is on its lower side i.e. facing toward the ground, which is by bending exposed to compression stresses, rounded and is actually shaped as a part of a circle or an ellipse, and is on its upper side i.e. facing away from the ground, which is by bending exposed to tension stresses, designed as a cup with a flat central surface, which, across slightly rounded edge areas, transitions into straight sections, which extend towards the sections of said rounded lower part, wherein the converging sections in the area of said transition from said cup-shaped upper side and said rounded lower side are welded together in the area of tension stresses above the neutral axis. Such a solution is relatively problematic due to the straight surface in the area, which is exposed to torsional stresses, which is, in the mutual overlapping area of each internal bearing section and each external bearing section, especially in the end area of each bearing section, locally exposed to significant surface stresses, which results in wearing and sometimes even leads to plastic deformations. The wall thickness can in such a case be somewhat smaller than the one employed in classical thick-walled tubular carrying sections, but must nevertheless still maintain a relatively significant thickness sufficient to enable such designed bearing section to retain its shape, carrying capacity and stability when exposed to stresses. Furthermore, such construction of bearing sections with a transversal cross-section, which comprises three rounded areas, is exceptionally complicated in view of manufacturing, starting from achieving the required accuracy, which effects the quality of the welds and the accuracy of each formed bearing section, which should conform to a mirror symmetry and should also be linearly aligned, since severe problems could occur in view of interference between the bearing sections of the telescopic arm, and could also lead to unpredictable distribution of stresses due to discrepancies in symmetry. A further problem results from positioning of the welds between the rounded and cup-shaped side, since welds are positioned on the side, which is exposed to tension stress, and are therefore each exposed to a combination of tension and shear forces, which can result in a serious risk of the crane collapsing due to the dynamically stressed welds especially during intensive long-term use.

By taking into consideration the previous information, a tubular profile of a telescopic arm in a crane is also disclosed in EP 2 185 462 B 1, wherein the lower bearing area thereof, which is by bending exposed to compression stresses, is generally semi-circularly shaped, while both sections attached thereto are straight and are directed towards each other and are in the opposite area, which is by bending of the bearing section exposed to tension stresses, shaped as a widened, downwards letter V facing towards said semi-circular area. Regarding the previously mentioned approach it is contemplated that a central area of said substantially semi-circular area, i.e. the vertex area, is made out of straight sections, which join together at an obtuse angle, wherein both sheet of metals in the area of their mutual connection form an angle, which is suitable for creating a weld without requiring any essential pre-treatment, and said weld is arranged in the compression zone. Such a profile is probably stronger than the one mentioned in EP 0 583 552 B1, however on both sides of the profile relatively large straight surfaces remain available, which might to a certain extent contribute to withstanding bending in the vertical plane, however without additional reinforcements may have relatively poor bearing performance against impacts from other directions. Furthermore, the state of stresses and deformations in the overlapping areas between each pair of sections of the telescopic arm under bending stresses is in this case relatively unfavourable, especially in each of the end areas of said V-shaped zones in the area exposed to torsional stress of the telescopic arm under bending stress, namely because the outer edge of the internal section protrudes towards the interior of the external bearing section by tending to push away or widen, which is unfavourable from the perspective of strength and from the perspective of surface pressure in the contact areas, which leads to severe wearing which can be enormously problematic during the long-term use of a crane with such a telescopic arm. Excessive deformations and the possibility of widening each external section can in this case be resolved exclusively by increasing the wall thickness of the profile, which however leads to additional weight of the telescopic arm and to already mentioned deficiencies resulting from such an increase of weight.

In order to form each bearing section of the telescopically designed section in a mobile crane from a single piece of sheet metal, the thickness of which should be smaller than that in the previously known solutions from the state of the art, in EP 2 185 461 B1 a profile cross-section is suggested, which is on its lower side, which is by bending in the vertical direction exposed to compression stresses, semi-circularly shaped, wherein in the top two thirds it is narrowed in the area of its straight profile and towards the remaining side converging walls, namely on that side, which is by bending in the vertical direction exposed to tension stress, so that said straight walls on one side pass into said semi-circular area in the compression zone, and also pass into the narrowed area in the tension zone, which is conceived as a V-shaped area with distinctly opened in the direction towards said walls extending sections. When starting from such a cross-sectional shape, which actually matches the one from the previously mentioned document EP 2 185 462 B1, the problems related to critical stresses, surface pressure and wearing in substantially stressed areas in mutually overlapping areas between each two adjacent bearing sections of each completely extended telescopic arm are substantially similar. Despite the initially emphasised goal of EP 2 185 461 B 1, that the section be made out of a single piece of sheet metal, in said source some different possibilities are contemplated from the perspective of assembling a profile by using two symmetrical cups, which would be welded in the area of both vertex points in the vertical plane, which are exposed to extreme compression or tensional stresses. Additionally, in said reference a possibility of using a material of different thicknesses along the same contour of the profile is contemplated, wherein the material would be thicker towards the inside. All these measures generally confirm that local stresses and deformations may reach or exceed critical values in the case of thinning the wall thickness, especially within each overlapping areas between adjacent bearing sections when the telescopic arm is under stress. It is also worth noting that introduction of different wall thicknesses and subsequent welding makes the process substantially more expensive while from a technical point of view and is also much more difficult for carrying it out, because in addition to increasing the weight, by welding some additional internal tensions may occur in combination with unpredictable deformations, which can even subsequently have impact the geometries of each bearing section during use of the crane and might therefore influence the actual state of stresses in one or more bearing sections of the telescopic arm, which may jeopardize accuracy of fitment between said bearing sections.

A telescopic unit for cranes is also disclosed in DE 23 17 595 A1.

The present disclosure introduces a bearing assembly in a mobile hydraulic crane telescopic arm, which generally comprises at least two tubular bearing sections, which are inserted within each other and are telescopically moveable along each other in the axial direction thereof by a suitable driving means, namely an outer tubular bearing section having a pre-determined length and an inner tubular bearing section having a pre-determined length, such that due to the similarity and complementary shape of their transversal cross-sections, insertion of one into another is enabled by simultaneously assuring of at least minimal overlapping length $L_9$ and also at least approximately uniform spacing between said sections along the complete circumference thereof. Suitable sliding pads are inserted within each gap between each adjacent bearing sections, which are correspondingly spaced apart from each other in the axial direction of the arm and are also properly arranged along the circumference of said sections in order to enable suitable matching between said mutually abutting bearing sections by simultaneously allowing required movements relative to each other in the axial direction in order to maintain friction as low as possible. Each of said tubular bearing sections, when observed in its cross-section, is designed with a substantially uniform wall thickness along the complete circumference thereof, while at the same time said cross-section is also mirror-symmetric with regard to the vertical geometric axis, in the direction of which the load weight force extends when said assembly is exposed exclusively to static loads and is exposed to stresses resulting from a bending moment around the horizontal geometrical axis as a neutral axis of each effective bearing cross-section of each bearing section during use of the crane, below which a compression zone is located, while a tension zone is located above said neutral geometrical axis.

In the context of resolving of the initially presented technical problem, the present disclosure proposes that each bearing section is in its cross-section designed such that said tension zone above said neutral axis and at a suitable distance apart from said neutral axis is arranged in a smaller substantially semi-circular area with a smaller radius, while in the area within the compression zone below said neutral axis is arranged in a larger substantially semi-circular area with a larger radius, which ends in its terminal points below the neutral axis and at a suitable distance apart from it, and is on its both sides symmetrical relative to the vertical axis tangentially extended by the straight sections, which extend across said neutral axis, such that each of them coincides with a complementary straight section at a pre-determined distance apart from said neutral axis and at an obtuse angle and is symmetrical relative to the vertical axis, by which the terminal points of said substantially semi-circular area with a smaller radius extend.

In one of the embodiments of the present disclosure, said straight sections, which extend tangentially with respect to said larger substantially semi-circular area with a larger radius and protrude above said neutral axis, are arranged parallel with each other.

In a further embodiment of the present disclosure, said straight sections, which extend tangentially with regard to said larger substantially semi-circular area with a larger radius and protrude above said neutral axis, are inclined relative to each other and symmetrical relative to said vertical axis converging towards the said smaller substantially semi-circular area with a smaller radius.

The radius $R_1$ of said smaller substantially semi-circular area within the tension zone above the neutral axis and the radius $R_2$ of the larger substantially semi-circular area within the compression zone below the neutral zone are determined in such a manner that the condition $1/4 \leq (R_1/R_2) \leq 3/4$ is fulfilled.

The height h of each tubular bearing section, namely the distance between the vertex points of said substantially semi-circular areas, relative to the width b of the tubular bearing section, which corresponds to diameter of the larger substantially semi-circular area within the compression zone below the neutral axis, is determined in such manner that the condition $1/2 \leq (b/h) \leq 4/5$ is fulfilled, wherein the preferred ratio between the width b and the height h is approximately 3/4.

The length d, which represents the distance between the neutral axis and each intersection between the smaller substantially semi-circular area within the tension zone above the neutral axis extending straight section and the larger substantially semi-circular area within the compression zone below the neutral axis extending straight section in the direction towards the smaller substantially semi-circular area is relative to the total height h of said tubular bearing section determined in such a manner that the condition $h/5 \leq d \leq h/4$ is fulfilled.

Additionally, the angle $\gamma$ between the smaller substantially semi-circular area within the tension zone above the neutral axis extending straight section and the larger substantially semi-circular area within the compression zone below the neutral axis extending straight section is selected within the range $140° \leq \gamma \leq 170°$.

In one embodiment of the present disclosure, wherein the straight sections, which extend tangentially with respect to said larger substantially semi-circular area with a larger radius and protrude above said neutral axis, are not arranged parallel to each other, the angle $\beta$ between the normal line of the larger substantially semi-circular area within the compression zone below the neutral axis extending straight section and the neutral bending axis is selected within the range $0 \leq \beta \leq 25°$. Taking this into account, the wall thickness t of each tubular bearing section is selected within the range 3 mm$\leq t \leq b/20$, furthermore the shortest length $L_9$ of the mutually overlapping area in the case that each internal tubular bearing section consisting of steel is fully extended in its axial direction from each external tubular bearing section consisting of steel relative to the height h of said internal tubular bearing section fulfils the condition $1.5\ h \leq L_9 \leq 3\ h$.

In the case that each bearing section in the telescopic bearing assembly consists of a cold formed steel plate, it can be shaped as a continuous shell and subsequently welded in the area of the vertex point on the larger substantially semi-circular area within the compression zone below the neutral axis, or in the areas of transition from the larger substantially semi-circular area into each associated tangential straight sections within the compression zone below the neutral axis.

For the purpose of simplifying manufacturing or in order to employ existing technological equipment by bending of a metallic sheet having a pre-determined thickness, each substantially semi-circular area above and below the neutral axis is approximated by a regular equilateral polygon, which is a polygon having at least 16 sides, namely a regular equilateral polygon, wherein the number of vertices exceeds 16, and is preferably a polygon having at least 24 sides.

A mobile telescopic hydraulic crane is also contemplated according to the present disclosure, which comprises a bearing platform, which is adapted for mounting of said crane on a motor vehicle and is optionally furnished with at least a pair of telescopic supporting legs, which are suitable for supporting said crane on the ground during transporting of each load in order to ensure the required carrying capacity and stability. A first terminal portion of a column is pivotally attached to said platform around the vertical geometric axis, wherein a first terminal portion of a primary bearing arm of the crane is pivotally attached to the second terminal portion of said column around the horizontal axis and is supported and pivoted around said horizontal geometrical axis on said column by means of a hydraulic cylinder, which is pivotally connected on one side with said column and on the other side with said primary bearing arm. A first end portion of a telescoping secondary bearing arm of the crane is attached pivotally around the horizontal geometric axis to the second terminal portion of said primary arm and is equipped with an attachment point on its second free terminal portion, which is suitable for mounting a grabber or any other suitable assembly for manipulating a load. Furthermore, said telescopic secondary arm is supported by and pivoted around said horizontal geometric axis of the primary arm by means of a hydraulic cylinder, which is directly or indirectly pivotally connected to either the first primary arm or secondary arm via a suitable linking mechanism. Furthermore, said secondary arm comprises a telescoping bearing assembly extendable in the longitudinal direction according to any of the previously described features.

BRIEF DESCRIPTION OF THE DRAWINGS

The present disclosure will be further explained by embodiments and in connection with attached drawings, wherein.

DETAILED DESCRIPTION

Figure 1:
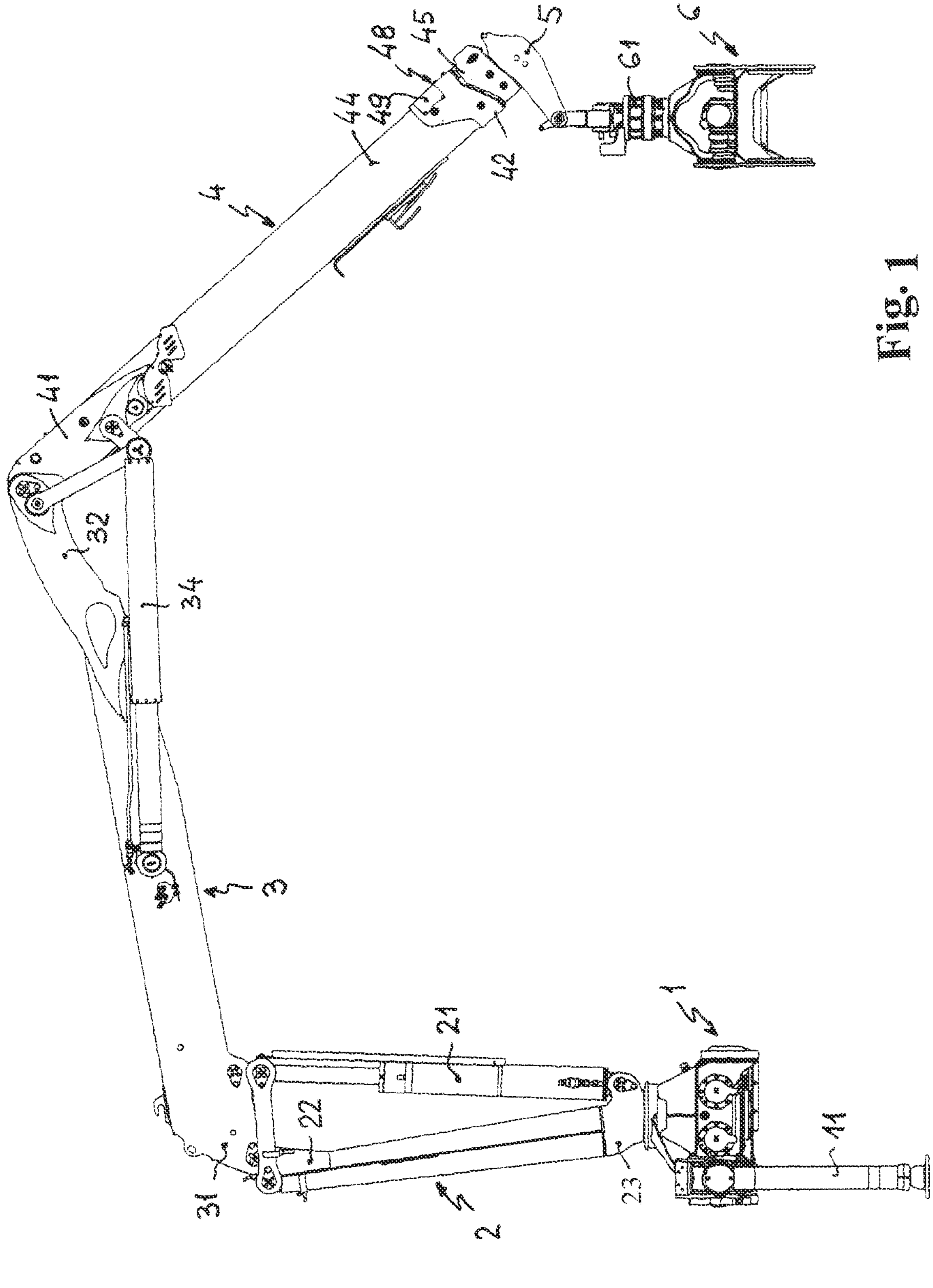
FIG. 1 presents a mobile hydraulic crane, which is suitable for mounting on a motor vehicle (not shown) and comprises a telescopic arm with a bearing assembly according to the present disclosure.
Figure 2:
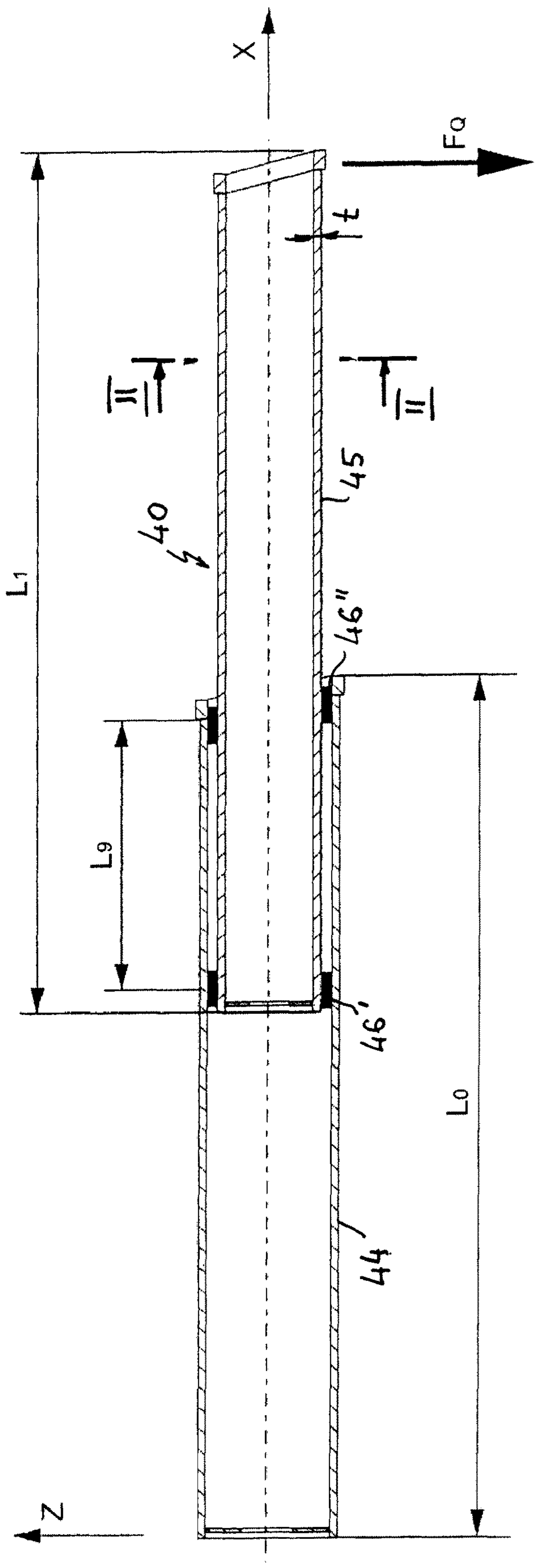
FIG. 2 shows a schematic view of a telescopic bearing assembly consisting of two tubular bearing sections according to the present disclosure, which are inserted within each other.

A bearing assembly 40 in a mobile hydraulic crane telescopic arm 4 according to FIG. 1 and FIG. 2 and comprises at least two tubular bearing sections 44, 45, which are inserted within each other and are in a controlled manner telescopically moveable along each other in the axial direction thereof by a suitable driving means. In the example shown and for simplification, only one external tubular bearing section 44 having a pre-determined length $L_0$ and one inner tubular bearing section 45 having a pre-determined length $L_1$ are shown, wherein due to their similarity and complementary shape of their transversal cross-sections, insertion of the internal tubular bearing section 45 into the external bearing section 44 is enabled by simultaneously assuring a minimal overlapping length $L_9$ and approximately uniform spacing between said sections 44, 45 along the complete circumference thereof. Suitable sliding pads 46', 46" are inserted within each gap between adjacent bearing sections 44, 45, which are correspondingly spaced apart from each other in the axial direction of the arm 4 and are also properly arranged along the circumference of said sections 44, 45 in order to enable suitable matching between said mutually abutting bearing sections 44, 45 by simultaneously allowing required movements relative to each other in the axial direction X in order to maintain friction as low as possible. Each of said tubular bearing sections 44, 45, when observed in its cross-section, is designed with a substantially uniform wall thickness t along the complete circumference thereof, while at the same time said cross-section is also mirror-symmetric with regard to the vertical geometric axis Z, in the direction of which the load $F_Q$ weight force extends when assembly 40 of the crane is exposed to static loads and stresses resulting from a bending moment around the horizontal geometrical axis Y as a neutral axis of each effective bearing cross-section of each bearing section 45, below which a compression zone is located, while a tension zone is located above said neutral geometrical axis Y.

The telescopic assembly 40 has bearing sections 44, 45 such that a smaller substantially semi-circular area $m_1$ with a smaller radius $R_1$ is arranged in the area of said tension zone above and at a suitable distance from said neutral axis Y, while in the area within the compression zone below said neutral axis Y a larger substantially semi-circular area $m_2$ with a larger radius $R_2$ is arranged, which ends in its terminal points C, C' below and at a suitable distance from the neutral axis Y, and is on both sides symmetric relative to the vertical axis Z tangentially extended by straight sections $n_2$, $n_2'$, which extend across said neutral axis Y, such that each of them coincides with a complementary straight section $n_1$, $n_1'$ at a pre-determined distance d apart from said neutral axis Y and at an obtuse angle γ and symmetric relative to the vertical axis Z, by which said substantially semi-circular area $m_1$ with a smaller radius $R_1$ extends in each of its terminal points A, A'.

Figure 3:
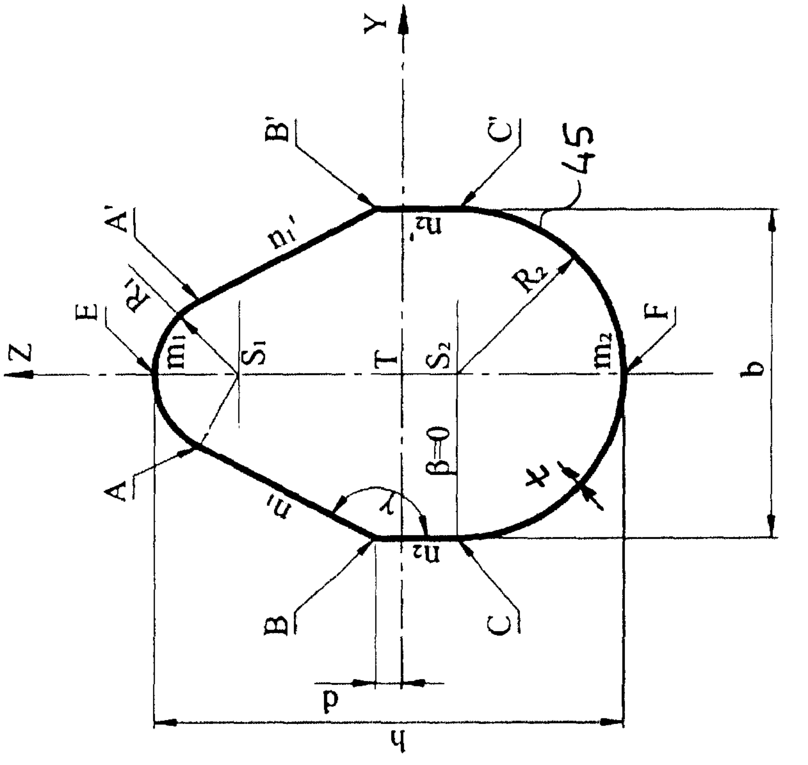
FIG. 3 shows the first embodiment of one of the tubular bearing sections, a cross-section along the plane II-II according to FIG. 2.

According to one of the embodiments of each of the tubular bearing sections 44, 45 of the bearing assembly 40 according to the present disclosure (FIG. 3), the straight sections $n_2$, $n_2'$, which extend tangentially with respect to said larger substantially semi-circular area $m_2$ with a larger radius $R_2$ and protrude above said neutral axis Y, are arranged parallel to each other.

Figure 4:
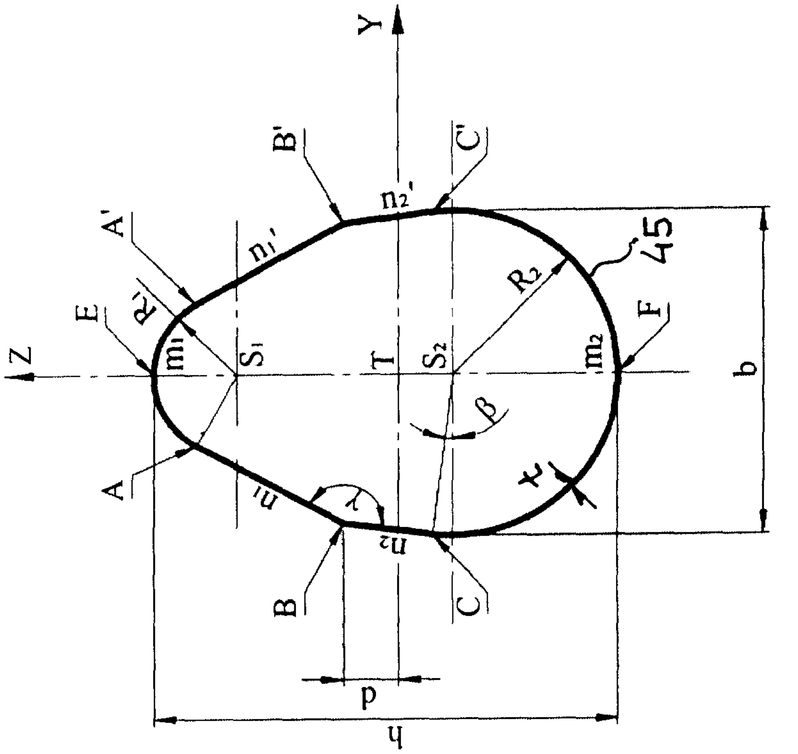
FIG. 4 shows the second embodiment of one of the tubular bearing sections, a cross-section along the plane II-II according to FIG. 2.

According to a further embodiment of the tubular bearing sections 44, 45 of the bearing assembly 40 according to the present disclosure (FIG. 4), the straight sections $n_2$, $n_2'$, which extend tangentially with regard to said larger substantially semi-circular area $m_2$ with a larger radius $R_2$ and protrude above said neutral axis Y, are inclined relative to each other and converge towards the said smaller substantially semi-circular area $m_1$ with a smaller radius $R_1$ symmetrically relative to said vertical axis Z.

The radius $R_1$ of the smaller substantially semi-circular area $m_1$ within the tension zone above the neutral axis Y and the radius $R_2$ of the larger substantially semi-circular area $m_2$ within the compression zone below the neutral zone Y are determined in such a manner that the condition $1/4 \leq (R_1/R_2) \leq 3/4$ is fulfilled.

The height h of each tubular bearing section 44, 45, namely the distance between the vertex points E, F (FIGS. 3 and 4) of said substantially semi-circular areas $m_1$, $m_2$, relative to the width b of the tubular bearing section 44, 45, which corresponds to diameter of the larger substantially semi-circular area $m_2$ within the compression zone below the neutral axis Y, is determined in such manner that the condition $1/2 \leq (b/h) \leq 4/5$ is fulfilled, however the preferred ratio between the width b and the height h is approximately 3:4.

The length d, which represents the distance between the neutral axis Y and each intersection B, B' between the smaller substantially semi-circular area $m_1$ within the tension zone above the neutral axis Y extending straight section $n_1$, $n_1'$ and the larger substantially semi-circular area $m_2$ within the compression zone below the neutral axis Y extending straight section $n_2$, $n_2'$ in the direction towards the smaller substantially semi-circular area $m_1$ is relative to the total height h of said tubular bearing section 44, 45 determined in such a manner that the condition $h/5 \leq d \leq h/4$ is fulfilled.

The angle γ between the smaller substantially semi-circular area $m_1$ within the tension zone above the neutral axis Y extending straight section $n_1$, $n_1'$ and the larger substantially semi-circular area $m_2$ within the compression zone below the neutral axis Y extending straight section $n_2$, $n_2'$ is selected within the range of $140° \leq \gamma \leq 170°$.

In cases where the straight sections $n_2$, $n_2'$ are not parallel to each other (FIG. 4), the angle) β between the normal line of the larger substantially semi-circular area $m_2$ within the compression zone below the neutral axis Y extending straight section $n_2$, $n_2'$ and the neutral bending axis Y is selected within the range $0 < \beta \leq 25°$. In the case where the straight sections $n_2$, $n_2'$ are parallel to each other (FIG. 3), the condition $\beta = 0$ is fulfilled.

It is understood by a person skilled in the art that each tubular bearing section 44, 45 is in the area above the neutral axis equipped with an additional longitudinal crease, which is consists of two straight sections $n_1$, $n_2$; $n_1'$, $n_2$, which converge at an obtuse angle γ and each individually belong to the larger substantially semi-circular areas $m_1$, $m_2$.

Such a concept of creating such a cross-section results in substantial reinforcement of each tubular bearing section 44, 45 from the perspective of strength and deformations and at the same time also leads to a substantially more effective fitment between sections 44, 45 even in the case of the smallest length $L_9$ of mutual overlapping.

Consequently, the wall thickness t of each tubular bearing section 44, 45 can be selected within the range $3\ \text{mm} \leq t \leq (b/20)$. Furthermore, the length $L_9$ of the mutually overlapping area of the sections 44, 45 in the case that internal tubular bearing section 45, having the length $L_1$ and consisting of steel is fully extended in the axial direction from each external tubular bearing section 44 having length $L_0$ and consisting of steel fulfils the condition $1.5\ h \leq L_9 \leq 3\ h$ where h is the height of said internal tubular bearing.

In one embodiment of the present disclosure, each of said tubular bearing sections 44, 45 in the telescopic bearing assembly 40 consists of a cold formed steel plate and is shaped as a continuous shell and welded in the area of the vertex point F on the larger substantially semi-circular area $m_2$ within the compression zone below the neutral axis Y. In an alternative embodiment of the present disclosure each of said tubular bearing sections 44, 45 in the telescopic bearing assembly 40 consists of a cold formed steel plate shaped as continuous shell and is welded in the transition areas C, C' from the larger substantially semi-circular area $m_2$ into associated tangential straight sections $n_2$, $n_2'$ within the compression zone below the neutral axis Y.

However, if manufacturing of perfectly or approximately rounded areas $m_1$, $m_2$ is too complicated using the required technical equipment each of said substantially semi-circular areas $m_1$, $m_2$ above and below the neutral axis Y could be approximated by bending of a metallic sheet having a pre-determined thickness t and approximating a regular equilateral polygon, which has at least 16 sides, preferably having at least 24 sides. Even in this case, by approximating a circular arc with an inscribed or circumscribed polygon with a sufficiently large number of vertices provides sufficiently similar rounded areas $mm_1$, $m_2$, which may provide the same advantages with regard to deformations and fitment between sections 44, 45.

The scope of the present disclosure also includes a mobile telescopic hydraulic crane with a bearing platform 1, which is adapted for mounting of said crane on each motor vehicle and is optionally furnished with at least a pair of telescopic supporting legs 11, which are suitable for supporting said crane on the ground during transporting of a load in order to ensure carrying capacity and stability. A first terminal portion 23 of platform 1 is pivotally attached to column 2 around the vertical geometric axis, furthermore, a first terminal portion 31 of a primary bearing arm 3 of the crane is pivotally attached around the horizontal geometric axis to the second terminal portion 22 of said column 2 and is supported and pivoted around said horizontal geometrical axis on said column 2 by means of a hydraulic cylinder 21, which is pivotally connected on one side with said column 2 and on the other side with said primary bearing arm 3. A telescoping secondary bearing arm 4 of the crane is attached by its first end portion 41 pivotally around the horizontal geometric axis to the second terminal portion 32 of said primary arm 3 and is on its second free terminal portion 42 equipped with an attachment point 5, which is suitable for mounting a grabber 6 or any other suitable assembly for manipulating a load. Said telescopic secondary arm 4 is supported and pivoted around said horizontal geometric axis on said primary arm 3 by means of a hydraulic cylinder 34, which is directly or indirectly connected to said primary arm 3 and said secondary arm 4 by a suitable linking mechanism.

The secondary arm 4 may comprises an extendable bearing section 40 which extends in the longitudinal direction X according to any of the previously described features.

What is claimed is:

1. A bearing assembly in a mobile hydraulic crane telescopic arm, comprising:

at least two tubular bearing sections, which are inserted within each other and telescopically moveable in a controlled manner in an axial direction, wherein an outer tubular bearing section having a pre-determined length $L_0$ and an inner tubular bearing section having a pre-determined length $L_1$ are complementary in shape in their transversal cross-sections, having a minimal overlapping length $L_9$ and approximately uniform spacing along a complete circumference, wherein sliding pads within each gap between adjacent bearing sections are spaced apart in the axial direction and arranged along the circumference of said sections, wherein each of said tubular bearing sections has a substantially uniform wall thickness t along the complete circumference thereof, wherein a cross-section of said tubular bearing sections is also mirror-symmetric relative to a vertical axis Z, wherein a first smaller substantially semi-circular cross-sectional area $m_1$ of each bearing section is arranged above a neutral axis Y and at a first distance apart from said neutral axis Y, wherein a larger substantially semi-circular area $m_2$ with a larger radius $R_2$ is arranged below the neutral axis Y, wherein terminal points C, C' of the larger substantially semi-circular area are arranged below the neutral axis Y and at a second distance apart from it, wherein the larger substantially semi-circular area is symmetric relative to the vertical axis Z, wherein a first pair of straight sections $n_2$, $n_2'$ extend from the terminal points C, C' across said neutral axis Y to intersection points B, B' that are a third distance from said neutral axis Y, wherein a second pair of straight sections $n_1$, $n_1'$ extend from the intersection points B, B' toward terminal points A, A' such that the second pair of straight sections $n_1$, $n_1'$ form an obtuse angle γ with said smaller substantially semi-circular area $m_1$, wherein said straight sections $n_2$, $n_2'$ are arranged parallel with each other.

2. The bearing assembly according to claim 1, wherein a radius $R_1$ of said smaller substantially semi-circular area $m_1$ within a tension zone above the neutral axis Y and the radius $R_2$ of the larger substantially semi-circular area $m_2$ within a compression zone below the neutral axis Y fulfil the following condition:

$$1/4 \le (R_1/R_2) \le 3/4.$$

3. The bearing assembly according to claim 2, wherein a height h of each tubular bearing section defined by the distance between vertex points E, F of said substantially semi-circular areas $m_1$, $m_2$, relative to the width b of the tubular bearing section which corresponds to diameter of the larger substantially semi-circular area $m_2$ within the compression zone below the neutral axis Y, fulfil the condition:

$$1/2 \le (b/h) \le 4/5.$$

4. The bearing assembly according to claim 3, wherein length d, which is the third distance between the neutral axis Y and each of the intersection points B, B', is defined with regard to the total height (h) of said tubular bearing section such that the following condition is fulfilled:

$$h/5 \le d \le h/4.$$

5. The bearing assembly according to claim 3, wherein a ratio of the width b and the height h is approximately 3:4.

6. The bearing assembly according to claim 4, wherein the angle γ is selected within the range:

$$140° \le \gamma \le 170°.$$

7. The bearing assembly according to claim 6, wherein an angle β between a line extending along a base of the substantially semi-circular area $m_2$ within the compression zone below the neutral axis Y and straight sections ($n_2$, $n_2'$) extending across the neutral axis Y is selected within the range:

$$0 < \beta \le 25°.$$

8. The bearing assembly according to claim 7, wherein a wall thickness t of each tubular bearing section relative to the width b thereof is selected within the range:

$$3\text{ mm} \le t \le (b/20).$$

9. The bearing assembly according to claim 8, wherein length $L_9$ of the mutually overlapping area, in which each internal tubular bearing section having the length $L_1$ and consisting of steel is fully extended from each external tubular bearing section having the length $L_0$ and consisting of steel in the axial direction, with regard to the height h of said internal tubular bearing section fulfils the following condition:

$$1.5\ h \le L_9 \le 3\ h.$$

10. The bearing assembly according to claim 9, wherein each of said tubular bearing sections in the telescopic bearing assembly consists of a cold formed steel plate shaped as a continuous shell and is welded in the area of the vertex point F on the larger substantially semi-circular area $m_2$ within the compression zone below the neutral axis Y.

11. The bearing assembly according to claim 9, wherein each of said tubular bearing sections in the telescopic bearing assembly consists of a cold formed steel plate shaped as continuous shell and is welded in the areas C, C' of transition from the larger substantially semi-circular area $m_2$ into each associated tangential straight section $n_2$, $n_2'$ within the compression zone below the neutral axis Y.

12. The bearing assembly according to claim 11, wherein each of said substantially semi-circular areas $m_1$, $m_2$ above and below the neutral axis Y is formed by bending a metallic sheet having a pre-determined thickness t, and is approximated by a regular equilateral polygon having at least 16 sides.

13. The bearing assembly according to claim 12, wherein each of said substantially semi-circular areas $m_1$, $m_2$ above and below the neutral axis Y is formed by bending a metallic sheet having a pre-determined thickness t, and is approximated by a regular equilateral polygon having at least 24 sides.

14. A mobile telescopic hydraulic crane, comprising:

a bearing platform adapted for mounting of said crane on a motor vehicle and is furnished with at least a pair of telescopic supporting legs suitable for supporting said crane on the ground during transporting of a load, a column having a first area within a first terminal portion and a second area within a second terminal portion, wherein the second terminal portion of the column is attached pivotally around a horizontal geometric axis to a primary bearing arm of the crane, wherein the primary bearing arm is supported and pivoted around said horizontal geometric axis by a hydraulic cylinder;

a telescoping secondary bearing arm having a first end portion that is pivotally attached to a second terminal portion of said primary arm, wherein the secondary arm comprises an attachment point for mounting a grabber for manipulating a load, wherein said telescopic secondary arm is supported and pivoted around said horizontal geometric axis by means of a hydraulic cylinder on said primary arm, wherein the hydraulic cylinder is directly or indirectly pivotally connected to said primary arm and to said secondary arm via a linking mechanism, wherein said secondary arm comprises the bearing assembly of claim 1 that is extendable in the longitudinal direction X of said secondary arm.

* * * * *